United States Patent [19]
Breed

[11] 3,889,130
[45] June 10, 1975

[54] MASS IN LIQUID VEHICULAR CRASH SENSOR

[75] Inventor: David S. Breed, Boonton, N.J.

[73] Assignee: Breed Corporation, Fairfield, N.J.

[22] Filed: June 4, 1973

[21] Appl. No.: 366,427

[52] U.S. Cl......... 307/121; 200/61.53; 280/150 AB
[51] Int. Cl. ........................................... H01h 35/14
[58] Field of Search... 307/121; 200/61.53, 61.45 R, 200/61.08; 280/150 AB; 180/91

[56] References Cited
UNITED STATES PATENTS

| | | | |
|---|---|---|---|
| 2,976,378 | 3/1961 | Goddard | 200/61.45 R |
| 3,549,169 | 12/1970 | Oldberg et al. | 200/61.53 X |
| 3,631,728 | 1/1972 | Prachar et al. | 200/61.53 |
| 3,715,535 | 2/1973 | Urenda | 200/61.53 |
| 3,793,498 | 2/1974 | Matsui et al. | 200/61.53 X |

Primary Examiner—Robert K. Schaefer
Assistant Examiner—M. Ginsburg
Attorney, Agent, or Firm—Learman & McCulloch

[57] ABSTRACT

The vehicular crash sensor of this invention comprises a sealed chamber substantially filled with a liquid having a low kinematic viscosity and containing a mass adapted to move through the liquid, a bias force acting on the mass to prevent its moving until a predetermined deceleration of the vehicle occurs. The liquid serves to lubricate hydro-dynamically the motion of the sensing means and to damp inertially its motion.

16 Claims, 3 Drawing Figures

3,889,130

MASS IN LIQUID VEHICULAR CRASH SENSOR

BACKGROUND OF THE INVENTION

Numerous crash sensors have been devised which sense and integrate the deceleration of a vehicle experiencing a crash and to initiate a passenger restraint system such as an inflatable air bag if the crash reaches a predetermined severity. Most of these systems have been spring mass systems carefully designed to minimize the effects of friction forces arising from angular crashes. The two most successful systems in one instant employ a pendulum principle and in the second a rolamite. Both of these systems are complex. In the rolamite system the tolerances on the band must be carefully controlled whereas in the pendulum system the design of the pivots is important to maximize the ruggedness of the unit while minimizing frictional forces. Both systems are subject to deterioration due to prolonged shock and vibration.

The present invention in its simplest form consists of a cylindrical mass in a cylinder which is substantially filled with fluid. The outside diameter of the mass contains grooves to provide a step bearing causing the mass to become approximately centered in the cylinder when it moves. The fluid flows through a passage in the center of the mass and is thus somewhat restricted. This in turn damps the motion of the mass and, if the fluid is properly chosen, this flow will take place at sufficiently high reynolds numbers to provide inertially limited flow and thus damping characteristics which are independent of temperature. Since all crash sensors must be sealed to protect them from their surrounding environment, this device is substantially simpler and thus less expensive than the other two approaches. In addition, being entirely surrounded by damping fluid, it is not subject to deterioration due to vibration or shock.

When the crash sensor is placed near the passenger compartment, the response time is important since the sensor experiences the deceleration pulse only slightly ahead of the passengers. In a spring mass system, the energy of a crash is first stored as kinetic energy in the mass and then converted to potential energy in compressing the spring. For short duration crashes, this process takes a significant period of time. In the sensor of this invention, however, the energy of the crash is constantly being dissipated as the crash proceeds, thus the position of the sensing mass at any time during the crash is a measure of the severity of the crash. As a result, the response time of the crash sensor of this invention is substantially shorter than the spring mass system.

In cases where the crash sensor is mounted near the front of the automobile where the crash pulse is particularly severe, the necessary travel of the sensing mass in the spring mass system may be 2 inches or more. This results in a crash sensor which is large, expensive, and unwieldy. The damping force on the mass in the crash sensor of this invention can be controlled by the size of the passage in the center of the mass. Thus, the travel of the sensing mass can be set at any convenient distance permitting the use of a relatively small sensor. On the other hand, when the sensor is placed in the passenger compartment where the crash pulse is relatively small, the travel of a mass in a spring mass system can become so short as to require careful control of the location of the electrical contacts which will activate the passenger restraint system. With the sensor of the present invention, a small piston can be placed in the passage in the center of the sensing mass. The motion of this small piston, therefore, can be made quite long even though the motion of the sensing mass is quite short. This amplifiction of the motion of the sensing mass thus permits use of greater tolerances in the location of the electrical contacts.

SUMMARY OF THE INVENTION

Briefly this invention consists of a hermetically sealed cylinder containing a sensing mass and substantially filled with a low kinematic viscosity fluid. When mounted in a vehicle, the sensing mass is biased toward the rear of the vehicle. If the vehicle experiences a crash of predetermined severity, the sensing mass begins moving forward and after moving an appropriate distance, two electrical contacts are closed or a firing pin is propelled into a detonator resulting in deployment of a passenger restraint system.

One of the primary objects of this invention is to provide a vehicle crash sensor which is exceedingly reliable, yet simple and inexpensive to manufacture.

Another object of this invention is to provide a vehicular crash sensor which is not substantially affected by deceleration components perpendicular to the axis of the sensor.

A further object of this invention is to provide a small vehicular crash sensor for mounting near the front of the vehicle.

A further object of this invention is to provide a crash sensor whose sensing mass motion is amplified to provide easy determination of the motion of the sensing mass when the sensor is located near the passenger compartment of the vehicle.

Still another object of this invention is to provide a vehicular crash sensor which has an exceedingly fast response to a crash impulse.

Other objects and advantages of this invention will become apparent as the description progresses.

DESCRIPTION OF THE PREFERRED EMBODIMENTS

Figure 1:
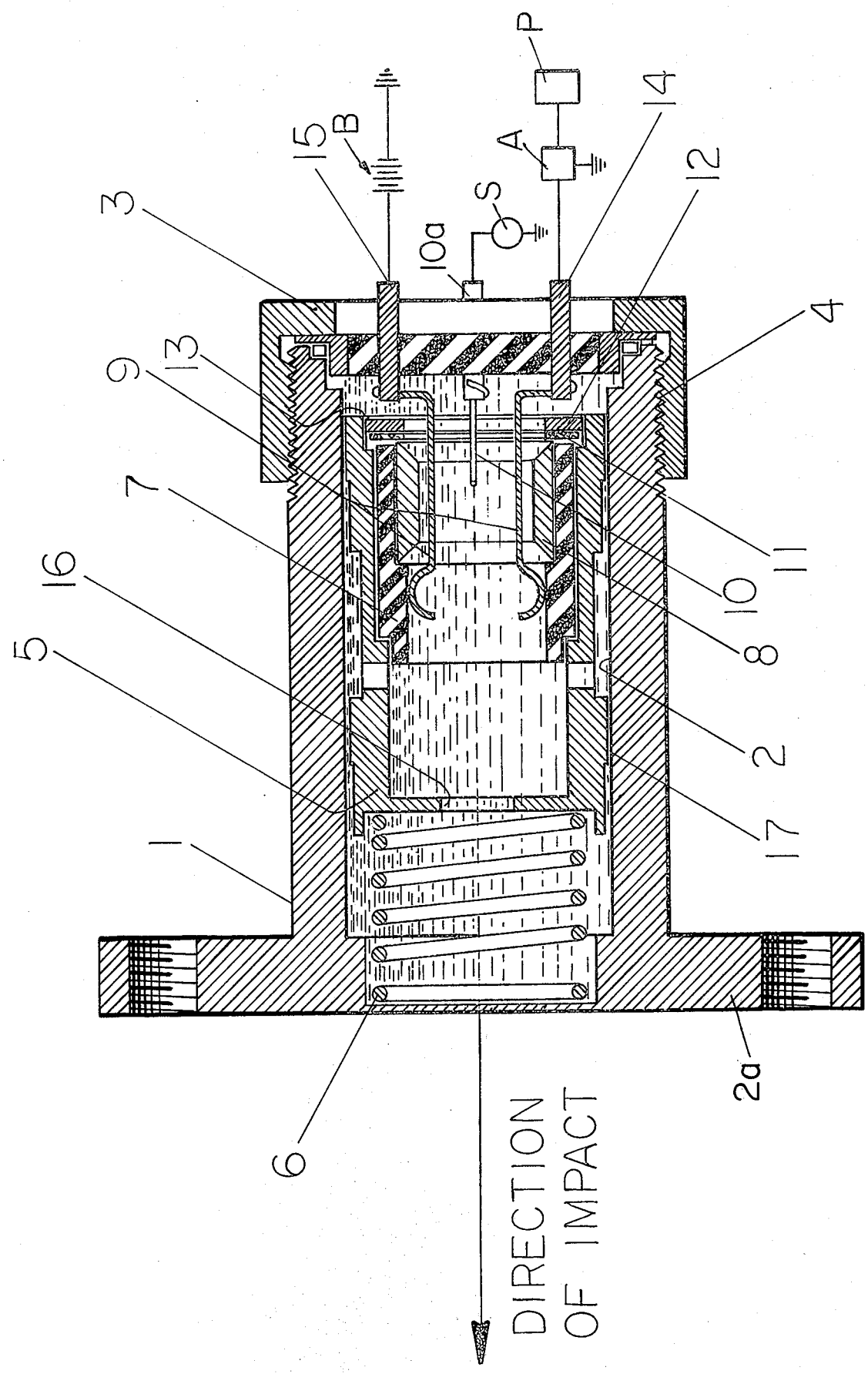
FIG. 1 is a cross sectional view of a crash sensor constructed according to one embodiment of the invention.

A crash sensor constructed according to the embodiment of FIG. 1 comprises a hollow body 1 forming a cylindrical chamber 2, the body terminating at one end in a mounting flange 2a and at the other end in an end plate 3. The end plate 3 is shown attached by means of threads 4. However, for most applications a welded joint would be used.

In the chamber is a thimble-shaped sensing mass 5, a bias spring 6, an insulator 7, a conductive contact or operating ring 8, and two sets of contacts, a normally open set 9 and a normally closed set 10. The contacts 10 normally engage the ring 8. Normally closed contacts 10 are of similar design as normally open contacts 9 and lie in a plane which is rotated 90° from the plane containing the normally open contacts. The contacts 10 are joined to terminals 10a, one of which may be connected to the energy source B and the other of which may be connected to a signal device S for the purpose of indicating circuit continuity. The contact ring and insulator are rigidly fixed to sensing mass 5 by means of an insulating washer 11 and a washer 12 which has been staked in by means of lip 13 on sensing mass 5. The remainder of the housing is substantially filled with a fluid having a low kinematic viscosity.

One of the contacts 9 may be connected to a source of energey B via a terminal 15 and the other contact 9 may be connected via a terminal 14 to an actuator A operable to activate a passenger restraint device P such as an inflatable air bag.

The spring 6 normally biases the mass 5 and its associated parts toward the right hand end of the body, as shown in FIG. 1. When the sensor experiences a deceleration, a force is exerted on the sensing mass. When this deceleration force exceeds the predetermined bias value of the spring 6, the sensing mass overcomes the spring force and begins moving to the left. After moving a prescribed distance, the ring 8 disengages the contacts 10 and, after an additional prescribed motion, the normally open contacts 9 engage the contact ring and an electrical current can flow between terminals 14 and 15 to initiate operation of the passenger restraint device P.

An axial orifice or passage 16 is provided in the sensing mass to restrict the flow of fluid through the center of the mass as it moves toward the left. Through a proper choice of passage diameter, sensor dimensions and fluid kinematic viscosity, the reynolds number describing the flow through this orifice is maintained significantly above 1 for all expected crashes for which the sensor must operate. The flow thus is inertially limited and thus is relatively independent of the viscosity of the fluid. As a result, the characteristics of the crash sensor are practically independent of temperature.

In order to minimize the effects of lateral acceleration components, the diameter of the mass 5 is sufficiently less than that of the chamber 2 to provide an annular clearance around the mass and the periphery of the mass 5 is grooved to provide step bearing pads 17. Thus, when the sensing mass begins moving, hydrodynamic bearing forces come into play which minimize the friction forces between the sensing mass and housing. By this means, the motion of the sensing mass is dependent almost entirely on the decleration component parallel to the axis of the sensor and relatively independent of acceleration components perpendicular to the sensor.

Figure 2:
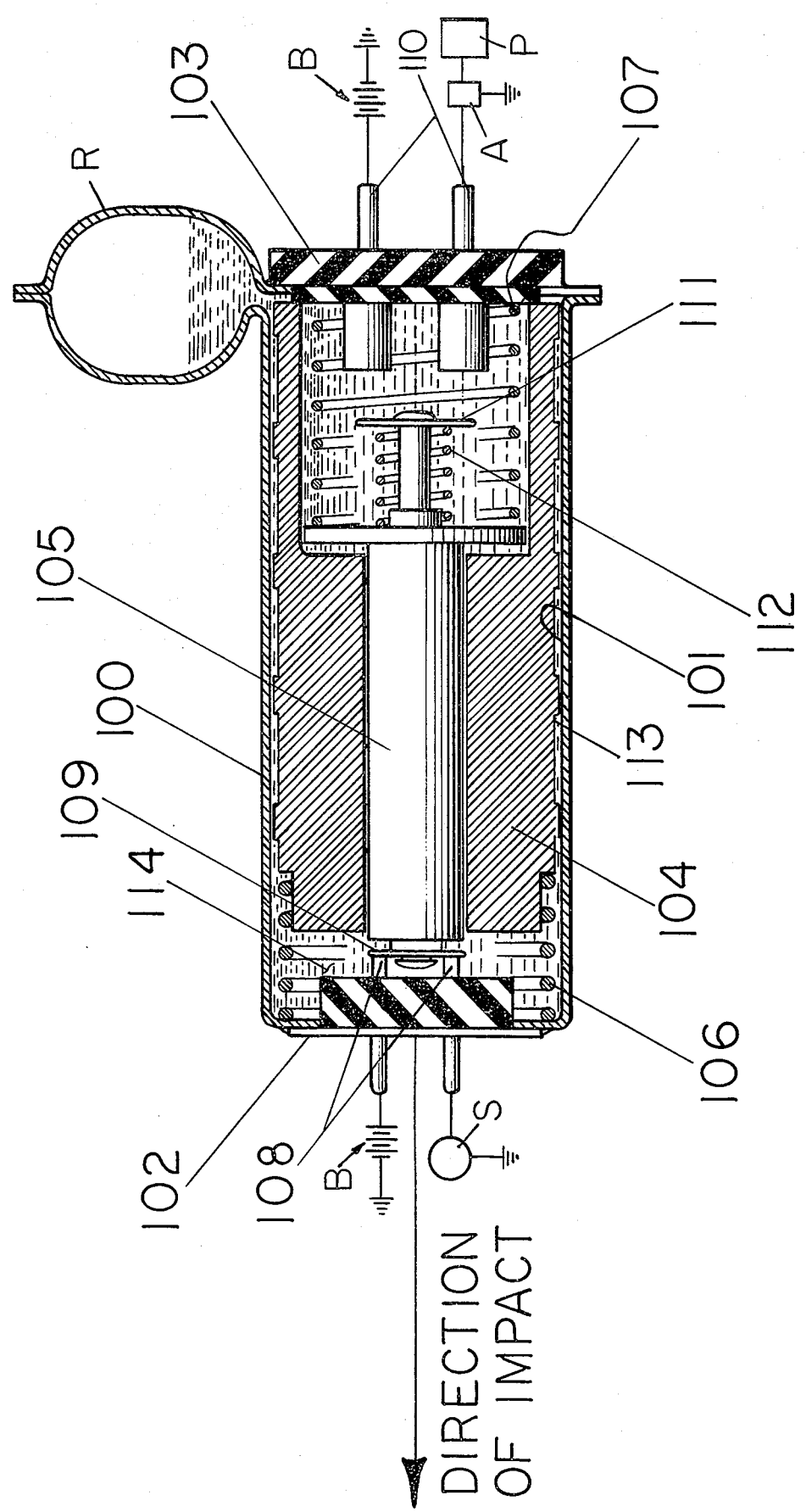
FIG. 2 is a partial cross sectional view of a crash sensor constructed in accordance with a second emmbodiment of the invention wherein a piston is used inside the sensing mass to amplify the motion of the sensing mass.

A crash sensor constructed in accordance with the embodiment of FIG. 2 comprises a hollow body 100 having a cylindrical chamber 101 and two end plates 102 and 103. Inside the chamber is an axially bored sensing mass 104 and a motion amplifying piston 105. A fluid 114 like that previously described fills the chamber and is supplied from a reservoir R carried by the body 100.

A bias spring 106 biases the sensing mass to the right, as viewed in the drawing, and a bias spring 107 biases the amplifying piston to the left. Normally closed contacts 108 are provided which normally are bridged by a contact disc 109. Similarly, normally open contacts 110 are provided which under the proper conditions are bridged by a contact or operating plate 111 carried by the piston 105 and being capable of limited axial movement relative to the latter. The contacts 110 are connected in a manner like that described in connection with the contacts 9. The contact plate 111 is biased toward the right by a spring 112, in order to permit over travel of the piston 105 and thus increase the contact duration. The periphery of the mass 104 is grooved to provide hydro-dynamic step bearings 113 on the sensing mass.

Upon sensing a crash of predetermined severity, the sensing mass 104 begins moving toward the left. Such movement increases the pressure in the fluid 114 in the left hand volume of the chamber. This pressure forces the piston 105 to the right, disconnecting the normally closed contacts and connecting the normally opened contacts. Thus, current can flow through contacts 110 to provide for actuation of the passenger restraint device.

Figure 3:
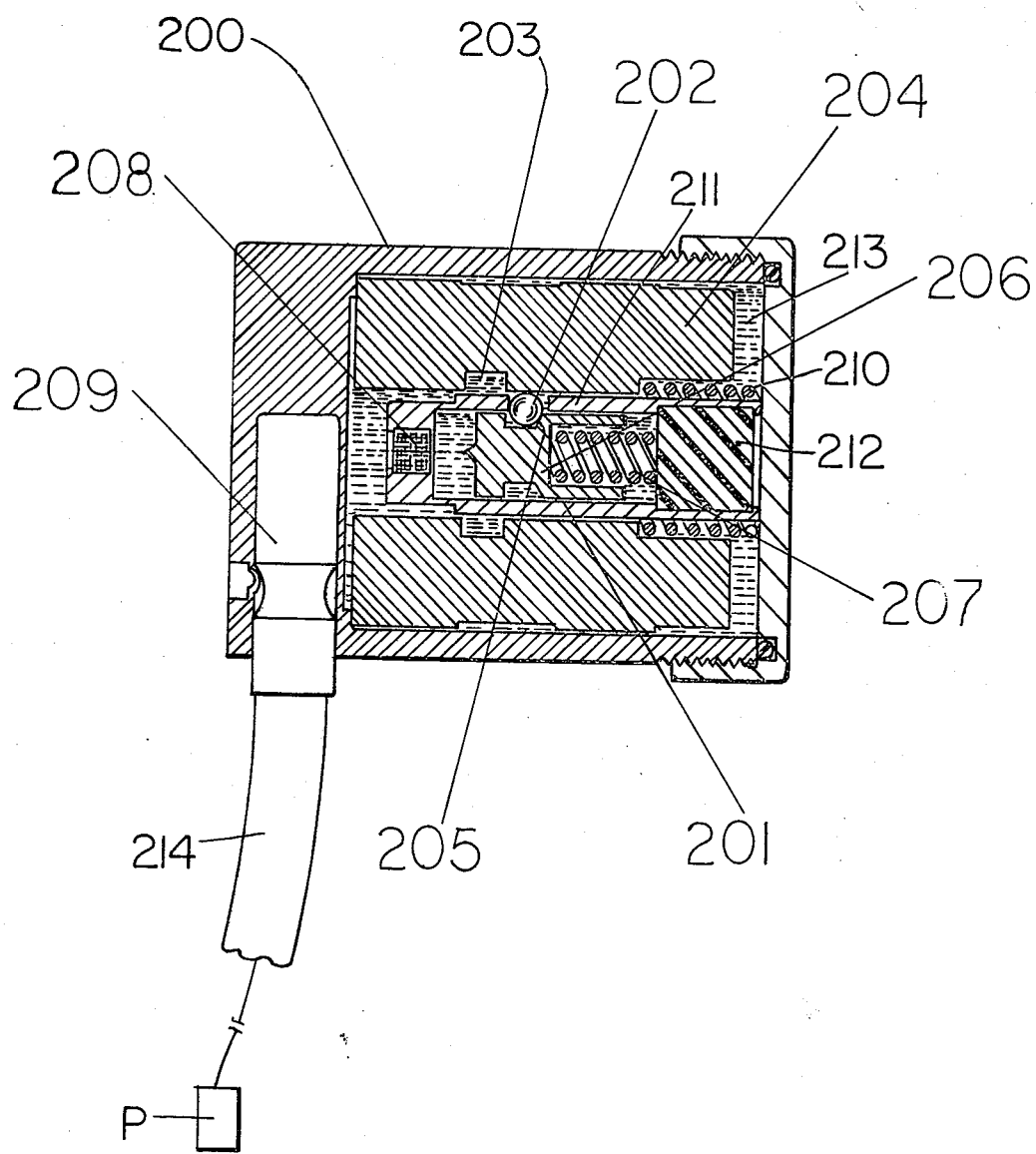
FIG. 3 is a partial cross sectional view of a crash sensor constructed according to a third embodiment of the invention and employing a pyrotechnic output.

A crash sensor according to FIG. 3 comprises a hollow body 200 forming a chamber within which is mounted a sensing mass 204 having an axial bore therethrough. The mass 204 is biased to the left as shown in FIG. 3 by a spring 210. Slidably mounted in the bore is a piston assembly comprising a thimble 211 closed at one end by a bearing block 212 and having at its other end a detonator charge 208. Within the thimble 211 an actuator or firing pin 201 that is biased toward the detonator 208 by means of a spring 207. The force of the spring 207 normally is overcome by a detent ball 202 which is received in a recess having a sloping wall 205 and which projects into an opening formed in the thimble 211. The bore of the mass 204 has a groove 203 therein adapted to receive the detent ball 202 under conditions to be described.

The interior of the body 200 is filled with a fluid 213 like the fluids heretofore described. The periphery of the mass 204 is grooved to form step bearing pads as described heretofore.

That end of the body 200 adjacent the detonator 208 has fitted therein an explosive booster 209 to which is connected one end of a detonator cord 214. The other end of the cord is connected to the passenger restraint device P.

In the operation of the FIG. 3 embodiment, a sudden deceleration of movement of the body 200 to the right, as viewed in the drawing, caused movement to the right of the mass 204, thereby causing the fluid 213 to act on the piston assembly and move the latter to the left. After a short time, the detent ball 202 is forced into the groove 203 in sensing mass 204, thereby releasing the firing pin 201 which is urged to the left by the spring 207 to impact and explode the detonator 208. By this time, the detonator will have reached a position adjacent the output booster 209 which picks up the explosion from the detonator 208. This explosion is then carried through detonator cord 214 to activate the passenger restraint device P explosively.

In the crash sensors shown in FIGS. 2 and 3, the flow of the fluid is at sufficiently high reynolds numbers to permit inertial fluid forces to dominate over viscous forces for all characteristic crashes and over the entire operating temperature range. Thus the Characteristics of all three sensor designs are practically independent of operating temperature.

In each case, a large portion of the change in energy experienced by the sensing mass is dissipated in fluid motion rather than being stored as kinetic energy in the mass or potential energy in the compressed spring. Thus at the conclusion of the crash pulse, the sensing mass has come nearly to rest having reached its maximum excursion. Thus for most crashes, the sensor would close the contacts or fire the detonator during the crash pulse or very shortly thereafter. This is in contrast to spring mass systems which require time to convert the kinetic energy of the mass into potential energy of the compressed spring. In every case, therefore, the sensors described herein will initiate the passenger restraint apparatus faster and sometimes significantly faster than spring mass systems.

The fluid used can be any common fluid having the proper liquid range. The dowanol fluids and high density brominated fluids, as manufactured by Dow Chemical Company, Midland, Mich., have been particularly successful. Generally, the fluid used will have a kinetic viscosity below 100 centistokes at 70° F.

Although three presently preferred embodiments have been disclosed, it should be understood that this invention is in no sense limited thereby but its scope is to be determined by that of the appended claims.

I claim:

1. A crash sensor for sensing acceleration above a predetermined acceleration threshold of a vehicle having a normally inactive passenger restraint system and means for actuating said system, said sensor comprising a housing having a wall defining a chamber; a sensing mass occupying said chamber, the cross-sectional dimension of said chamber being greater than the corresponding dimension of said mass to provide an annular clearance between said mass and said wall and the longitudinal dimension of said chamber being greater than the corresponding dimension of said mass whereby said mass is enabled to move in a direction longitudinally of said chamber, said mass having a passage extending therethrough in the direction of longitudinal movement thereof; a liquid having kinematic viscosity lower than 100 centistokes at 70° F. and together with said mass substantially filling said chamber whereby the liquid may flow through said passage and said clearance operating means including means carried by said mass and responsive to predetermined movement of said mass in one direction to operate said actuating means; and biasing means acting on said mass and disabling said movement thereof in said one direction until said predetermined acceleration threshold is exceeded.

2. The construction set forth in claim 1 wherein said liquid exerts a damping force on said sensing mass.

3. The construction set forth in claim 1 including hydro-dynamic bearing means between said sensing mass and said wall.

4. The construction set forth in claim 1 wherein said actuating means includes electrical contacts.

5. The construction set forth in claim 4 wherein said operating means includes contact means for engaging said electrical contacts, said contact means and said sensing mass being capable of relative movement following engagement of said contacts by said contact means.

6. The construction set forth in claim 1 wherein said actuating means includes an explosive detonator.

7. The construction set forth in claim 1 wherein said operating means includes piston means within said sensing mass acted on by said liquid and operable to amplify said movement of the sensing mass.

8. Vehicular crash sensor and protective apparatus comprising a housing having a wall defining an elongate, cylindrical chamber; a cylindrical sensing mass within said chamber, said mass having an axial passage therethrough and having a diameter sufficiently less than that of said chamber to provide an annular clearance between said mass and said wall, said mass being shorter than the length of said chamber to enable movement of said mass axially of said chamber; a liquid having a kinematic viscosity lower than 100 centistokes at 70° F. and together with said mass substantially filling said chamber whereby said liquid may flow through said passage and said clearance means biasing said mass to move in one direction in said chamber and operable to prevent movement of said mass in the opposite direction until said mass is subjected to a predetermined acceleration force in said opposite direction; a passenger protection device; means for actuating said device; and operating means including means carried by said mass for operating said actuating means in response to predetermined movement of said mass in said opposite direction.

9. The construction set forth in claim 8 wherein said liquid exerts a damping force on said sensing mass.

10. The construction set forth in claim 8 including hydro-dynamic bearing means between said sensing mass and said wall.

11. The construction set forth in claim 8 wherein said actuating means includes electrical contacts.

12. The construction set forth in claim 11 wherein said operating means includes contact means for engaging said electrical contacts, said contact means and said sensing mass being capable of relative movement following engagement of said contacts by said contact means.

13. The construction set forth in claim 8 wherein said actuating means includes an explosive detonator.

14. The construction set forth in claim 8 wherein said operating means includes piston means within said sensing mass and acted on by said liquid to move in said one direction in response to the movement of the sensing mass in said opposite direction.

15. An inertially damped crash sensor for sensing acceleration above a predetermined acceleration threshold of a vehicle having a normally inactive passenger restraint system and means for actuating said system, said sensor comprising a housing having a wall defining an elongate, sealed chamber; a sensing mass occupying said chamber and having a cross-sectional dimension sufficiently less than that of said chamber to provide an annular clearance between said mass and said wall, said mass having a length less than that of said chamber whereby said mass is capable of movement longitudinally of said chamber, said mass having a passage extending longitudinally therethrough; a liquid of low kinematic viscosity together with said mass substantially filling said chamber whereby said liquid may flow through said passage and said clearance and means biasing said mass to move in one direction in said chamber and disabling movement of said mass in the opposite direction until said predetermined acceleration threshold is exceeded, the radius of said clearance, the diameter of said passage, and the viscosity of said liquid being so related that the flow of said liquid through said passage in response to movement of said mass in said opposite direction is at a reynolds number greater than 1, whereby such flow is limited inertially and is substantially independent of temperature variations of said liquid.

16. The construction set forth in claim 15 wherein said mass has a plurality of axially spaced, circumferential grooves in its periphery to provide a plurality of hydrodynamic bearing surfaces confronting said wall.

* * * * *